United States Patent [19]

Albain et al.

[11] Patent Number: 5,174,953
[45] Date of Patent: Dec. 29, 1992

[54] METHOD OF MAKING COMPOSITE SINTERED ARTIFACT

[75] Inventors: Jonathan L. Albain; Adrian W. Paterson, both of Pretoria, South Africa

[73] Assignee: Lillywyte Societe Anonyme, Luxembourg, Luxembourg

[21] Appl. No.: 773,160

[22] Filed: Oct. 9, 1991

[30] Foreign Application Priority Data

Oct. 15, 1990 [GB] United Kingdom ............... 9022314

[51] Int. Cl.⁵ ............................................. B22F 3/12
[52] U.S. Cl. ..................................... 419/38; 419/19; 419/23; 419/39; 75/232; 75/228
[58] Field of Search ............... 419/19, 23, 38, 39; 75/228, 232

[56] References Cited

U.S. PATENT DOCUMENTS

| | | | |
|---|---|---|---|
| 4,299,627 | 11/1981 | Shinohara et al. | 419/8 |
| 4,386,960 | 6/1983 | Iacovangelo | 419/9 |
| 4,602,956 | 7/1986 | Partlow et al. | 75/235 |
| 4,610,726 | 9/1986 | King | 419/12 |

FOREIGN PATENT DOCUMENTS 0195504 2/1986 European Pat. Off.
819086 8/1959 United Kingdom.

OTHER PUBLICATIONS

Chance, "Refractory Metallization of green Ceramic," 1 Metallurgical Transactions 685-94 (Mar. 1970).
Otsuka, et al., "Interfacial Bond Strength in Alumina Ceramics Metallized and Cofired with Tungsten," 60 American Ceramic Society Bulletin 540-45 (1981).
Stringer, "Role of Coatings in Energy-Producing Systems: An Overview," 87 Materials Science and Engineering 1-10 (1987).

*Primary Examiner*—Daniel D. Wasil
*Assistant Examiner*—Daniel Jenkins
*Attorney, Agent, or Firm*—Arnold, White & Durkee

[57] ABSTRACT

A method is disclosed of making a sintered composite unitary artifact having an alpha-alumina component fast with a metal component. Particulate alpha-alumina and a glass-forming additive are mixed together; and a green artifact is pressed having an alumina portion formed from the mixture and a metal portion formed from a particulate metal. The green artifact is then heated under a non-oxidizing atmosphere to a temperature at which both portions undergo densification. This provides a sintered artifact having a debased alpha-alumina component sintered to a metal artifact.

12 Claims, No Drawings

METHOD OF MAKING COMPOSITE SINTERED ARTIFACT

This invention relates to a method of making a composite sintered artifact. More particularly it relates to a method of making a composite unitary sintered artifact comprising an α-alumina component and a metal component fast with each other.

According to the invention there is provided a method of making a composite unitary sintered artifact comprising 90-99% by mass of an α-alumina component and 1-10% by mass of a metal component fast with each other, the method comprising the steps of:

mixing together, to form a particulate mixture, particulate α-alumina and at least one particulate additive which, when dispersed in particulate form in particulate α-alumina, lowers the temperature at which densification of the α-alumina in response to heating;

pressing, from said mixture and a particulate metal, a composite green artifact having an alumina portion formed from said mixture and a metal portion formed from said particulate metal; and heating the green artifact under a non-oxidizing atmosphere to a temperature at which the portions both undergo densification, to provide a composite sintered artifact comprising a debased α-alumina component sintered to a metal component.

The particulate metal may be selected from the group consisting of transition metals, alloys of transition metals (eg Ni, Fe, Ti, V, Cr, Zr, Nb, Mo), steels, superalloys of Fe and Ni, and mixtures thereof. Preferably a transition metal of the first series such as Ni, Fe or a Fe-based alloy such as steel or superalloy thereof is employed.

The metal may have an average particle size of at most 20μ, preferably at most 10μ and more preferably at most 3 μm. Similarly, the α-alumina and additive may have an average particle size of at most 3 μm, preferably 1μ and more preferably 0.7 μm. Thus, in particular, the α-alumina and additive may have a particle size of at most 3 μm, the particulate metal having a particle size of at most 20 μm.

The additives which are mixed with the α-alumina to provide, after sintering, the debased α-alumina component, may be so-called glass-formers. In particular, thus, the additive may be a glass-forming additive selected from the group consisting of nickel and oxides of manganese, titanium, silicon, nickel, iron, cobalt, chromium, aluminium, calcium, magnesium, boron and mixtures thereof. Examples are MnO, $MnO_2$, $Mn_2O_3$, $Mn_3O_4$, $TiO_2$, $Ti_2O_3$, $Ti_3O_5$, $SiO_2$, Ni, NiO, $Fe_3O_4$, CoO, $Cr_2O_3$, $Al_2O_3$, CaO, MgO and $B_2O_3$, preferably MnO, $MnO_2$, $SiO_2$, $TiO_2$, Ni, NiO, $Fe_3O_4$, CoO and MgO. A single additive may be used, or, more typically, a mixture of additives. Generally, the additive[s] used and the proportion thereof used, will be selected to lower the densification temperature of the α-alumina by a desired degree. Examples of additives or mixtures thereof, the proportions in which they can be used, and the degree to which they reduce the densification temperature of α-alumina (which when not debased is typically, depending on particle size, about 1500° C-1600° C.) are as follows:

| Additive Mixture Composition (% by Mass) | | | | | Temperature Reduction (°C.) |
|---|---|---|---|---|---|
| $Al_2O_3$ | $MnO_2$ | $SiO_2$ | $TiO_2$ | Ni | |
| 98:00 | 0:77 | 0:53 | 0:70 | — | 255-272 |
| 97:34 | 0:76 | 0:53 | 0:70 | 0:67 | 255-272 |

Heating will be to a sintering temperature below the melting point of the metal of the metal component, but above the temperature at which the alumina and metal portions of the green artifact densify. Thus, the heating may be to a temperature of 1150° C. (the lowest practicable densification temperature for debased α-alumina in this system) —1453° C. (the melting point of nickel). More usually, the sintering temperature will be in the range 1250°-1380° C.

The Applicant has found that the formation of a sintered bond between the α-alumina component and the metal component is not particularly sensitive to the sintering schedule used, and sintering schedules commonly used in the formation of α-alumina sintered ceramics from α-alumina powder usually lead to bonding. However, optimization of bond strength is sensitive to the sintering temperature and the best bond strengths appear to occur at a sintering temperature in the above range of 1250°-1380° C. For particular cases, routine experimentation in this range can be employed to obtain the best, or at least an acceptable, firing temperature.

Similarly, bond formation is not particularly sensitive to the Composition of the debased alumina but, typically, the more glass-forming additive used and the lower the densification temperature of the α-alumina powder, the stronger the bond between the metal component and the α-alumina component.

In contrast, the Applicant has found that differential densification rates between the metal portion of the green artifact and alumina portion can cause disruption of the artifact during sintering and/or loss of bond integrity between the metal and the α-alumina components. Routine experimentation should thus be employed to determine, for particular cases, an acceptable or optimum firing schedule. Examples of firing schedules are:

Firing Schedule 1
  300° C./hr from room temperature to 450° C.
  30 minute dwell
  300° C./hr from 450° C. to 950° C.
  30 minute dwell
  75°-300° C./hr from 950° C. to 1250°-1350° C.
  30 minute dwell
  about 12 hour cool down to room temperature Firing Schedule 2
  180° C./hr from room temperature to 1250°-1350° C.
  zero dwell
  about 12 hour cool down to room temperature.

Bond formation has also been found to be sensitive to the actual metal used and, particularly, to its maximum particle size, with finer powders in general leading to stronger bonds. While relatively monosized metal powders can be used, the powders need not necessarily be monosized and the Applicant has achieved satisfactory results with metal powders comprising a mixture of a fine powder fraction eg of particle size of 2.2-3.0μ and a coarse fraction eg of particle size of 10-20μ in a mass ratio of fine: coarse of 1.0:0.01-1.0:0.6, preferably 1.0:0.02-1.0:0.2.

The non-oxidizing atmosphere under which heating takes place may be inert or reducing with respect to oxygen, e.q. argon as an inert atmosphere or reducing atmospheres of nitrogen mixed with hydrogen and containing small amounts of oxygen and water as follows:

| Hydrogen Content (% by mass) | Oxygen Content (mass parts per million) | Dew Point (°C.) |
| --- | --- | --- |
| 9:4 | 1:1 | −77:3 |
| 9:5 | 3:4 | −82:2 |
| 9:3 | 2:0 | −74:8 |
| 9:4 | 3:9 | −78:5 |
| 9:6 | 3:6 | −97:5 | the pressing, which may be isostatic or preferably uniaxial will typically be to a pressure determined by the nature and composition of the various components, the configuration or arrangement thereof, and their particle sizes, and may be to a pressure of 2–120 MPa, preferably 40–100 MPa.

The particulate mixture, formed from said α-alumina and additive, may, as indicated above, comprise 1–10% by mass of the additive and 90–99% by mass α-alumina, preferably 2–8% by mass additive and 92–98% by mass α-alumina.

A further feature which the Applicant has found to improve bond strength between the metallic component and the α-alumina component in the sintered artifact is the admixing, into the alumina-containing mixture used for the alumina portion of the green artifact, of a proportion of the metal used for the metal portion of the green artifact. Thus the method may include admixing, into said particulate mixture, 0.25–5% by mass of the metal of the metal component, in particulate form and of a particle size of at most 3 μm. Preferably 0.5–0.9% of a particle size of 2.2–3 μm is employed.

While it is in principle possible to make composite sintered artifacts of relatively complex shapes, the Applicant believes that the method of the invention will usually be used to make artifacts in which the α-alumina and metal components are in the form of flattened layers which are arranged face-to-face with each other. These layers will typically each contribute to the strength of the artifact and will thus have a structural function, respectively having a thicknesses after sintering of at least 0.3 mm for the metal layer and 4.0 mm for the ceramic layer, eg 1.2–6 mm for the metal layer and 5–20 mm for the ceramic layer.

When the formation of a bond between the metal component and the α-alumina component is difficult or impossible to achieve, a particular feature of the invention provides for the provision of an intermediate layer, sandwiched between the metal portion and the alumina portion in the green artifact, which is a particulate mixture of the particulate metal of the metal portion, and the material of the alumina portion. The proportions of the metal and α-alumina-containing mixture used to make up the intermediate layer can vary over a wide range of compositions, e.g. the metal proportion can vary from 20–80% by mass, the balance being the material of the alumina portion, mass ratios of metal:ceramic typically being 50:50–60:40. The invention also contemplates adding other metals and/or ceramics to this intermediate layer to improve bonding, which are not necessarily the same metals or ceramics as those of the metal portion or ceramic portion respectively. Furthermore, two or more intermediate layers of different compositions may be used together, sandwiched in series between the metal and the alumina portions of the green artifact, typically with the proportion of metal in each layer decreasing progressively in a direction from the metal portion to the alumina portion. In other words, the method may include the step of providing at least one intermediate component in the artifact, between the α-alumina component and the metal component, by admixing together the mixture from which the alumina component is formed with the particulate metal from which the metal component is formed, to form an intermediate mixture, the particulate metal in the intermediate mixture having a particle size of at most 3 μm, the intermediate mixture comprising 20–80% by mass of said metal and 20–80% by mass α-alumina, the intermediate mixture being sandwiched as an intermediate portion between the alumina portion and the metal portion during the pressing of the green artifact; and a plurality of said intermediate components may be provided between the α-alumina component and the metal component, the metal content of said intermediate components increasing successively in a direction from the α-alumina component to the metal component.

A further particular feature of the invention, when differential densification of the metal portion and the alumina portion is a problem, is the provision of an additional or stabilizing portion or layer of α-alumina-containing mixture on the side of the metal portion of the green artifact opposite the alumina portion, so that the metal portion is sandwiched between the alumina portion and the stabilizing portion, which resists differential densification and disruption of the artifact on firing. An artifact will thus be produced with a metal component sandwiched between two α-alumina components, and the component formed from the stabilizing portion can then be removed, e.g. by grinding, if not required in the final product. The stabilizing portion may have the same composition as the α-alumina-containing portion, or it may have a different composition, e.g. that of an intermediate layer or indeed some other composition. This stabilizing portion can, when the artifact is of layered construction, be in the form of a layer e.g. 0.1–0.9 mm thick. Accordingly, the method may include the step of resisting disruption of bonds between components of the artifact caused by differences in the densification rates of the metal component and the α-alumina component during the heating, by providing, on the side of the metal component remote from the α-alumina component, a stabilizing component, the stabilizing component being provided by pressing, during the pressing step, a stabilizing portion formed from a particulate stabilizing mixture against the side of the metal portion remote from the alumina portion, the stabilizing portion being sintered during the heating step and the stabilizing mixture comprising 20–98% by mass α-alumina.

Naturally, it will be appreciated that an artifact of several alternating components or layers can be the final product, e.g. a metal layer sandwiched between two α-alumina layers, or vice versa. In this embodiment, the pressing is preferably such as to provide the green artifact with a layered construction, each said portion being in the form of a layer, so that the metal component has a thickness of 0.3–10 mm, the α-alumina component having a thickness of 4–30 mm, and any other component has a thickness of 0.1–0.9 mm.

The invention will now be described, by way of non-limiting illustrative example, with reference to the following Examples, which describe tests conducted by the Applicant.

In these tests, various ceramic component compositions were employed, comprising mixtures of α-alumina and certain additives. The α-alumina used was A16-SG grade α-alumina obtained from Aluminium Company of America, Pittsburgh, Pa., U.S.A. and in each case the additives had a maximum particle size of about 7 μm. The compositions of the mixtures are as follows, in terms of % by mass of constituents:

| Composition | 1 | 2 | 3 | 4 | 5 | 6 | 7 | 8 | 9 | 10 | 11 |
|---|---|---|---|---|---|---|---|---|---|---|---|
| α-alumina | 96:21 | 96:32 | 97:03 | 92:64 | 93:41 | 96:34 | 96:03 | 96:00 | 98:00 | 97:34 | 97:0 |
| $MnO_2$ | — | — | — | — | — | — | 1:85 | 1:53 | 0:77 | 0:76 | 1:15 |
| $SiO_2$ | — | — | — | — | — | — | — | 1:06 | 0:53 | 0:53 | 0.80 |
| $TiO_2$ | 3:79 | — | 1:03 | 3:79 | 3:63 | 1:84 | 1:85 | 1:41 | 0:70 | 0:70 | 1:05 |
| Ni287 | — | — | 0:97 | — | — | — | — | — | — | 0:67 | — |
| Ni255 | — | — | — | — | — | — | — | — | — | — | — |
| $Fe_3O_4$ | — | 3.68 | — | — | — | — | — | — | — | — | — |
| CoO | — | — | 0:97 | 3:57 | — | — | — | — | — | — | — |
| MnO | — | — | — | — | 2:96 | 1:50 | — | — | — | — | — |
| MgO | — | — | — | — | — | 0:32 | — | — | — | — | — |

The Ni287 and Ni255 were nickel powders sold under the trade name Inco and obtained from International Nickel Co. Inc., U.S.A. The material differences between Ni287 and Ni255 relate to their bulk density and average particle size, which are 0.50–0.65 g/cm$^3$ and 2.2–3.0 μm respectively for Inco Ni255 and 0.75–0.95 g/cm$^3$ and 2.6–3.3 μm respectively for Inco Ni287.

Samples were made by pressing the various ceramic component compositions in a uniaxial press at various pressures in circular or annular dies of various diameters, as layers, together with layers of various metals in particulate form, after formation of the mixtures by mixing until homogeneous in various ways. The amounts of said compositions and metals used were selected to obtain products, after sintering, which were circular or annular and disc-like in shape, in which the ceramic components were layers in the thickness range of 4–5 mm and the metal components were layers in the thickness range of 0.8–1.3 mm.

For the metal layers said Ni255 and Ni287 nickel powders were used, and also Inco HDNP nickel powder which is also available from International Nickel Co. Inc, having a bulk density of 3.6–4.4 g/cm$^3$ and an average particle size of 15–20 μm.

In each case a similar reducing atmosphere was used namely a hydrogen content of about 9.3–9.6% by mass, an oxygen content of about 2.0–3.9 parts per million by mass and a dew point of 74.8°–97.5° C.

Several different firing schedules were used, as follows:

Schedule No 1

180° C./hr from room temperature to 330° C.
30 minute dwell
300° C./hr from 330° C. to 950° C.
120° C./hr from 950° C. to 1300° C.
30 minute dwell
300° C./hr from 1300° C.–600° C.
approximately 200° C./hr from 600° C. to room temperature.

Schedule No 2

300° C./hr from room temperature to 400° C.
30 minute dwell
300° C./hr from 400° C. to 950° C.
30 minute dwell
120° C./hr from 950° C. to 1300° C.
30 minute dwell
300° C./hr from 1300° C. to 600° C.
approximately 200° C./hr from 600° C. to room temperature.

Schedule No 3

300° C./hr from room temperature to 400° C.
30 minute dwell
300° C./hr from 400° C. to 1300° C.
180 minute dwell
300° C./hr from 1300° C. to 600° C.
approximately 200° C./hr from 600° C. to room temperature.

Schedule No 4

300° C./hr from room temperature to 400° C.
30 minute dwell
300° C./hr from 400° to 950° C.
120° C./hr from 950° C. to 1300° C.
30 minute dwell
300° C./hr from 1300° C. to 600° C.
approximately 200° C./hr from 600° C. to room temperature.

Schedule No 5

180° C./hr from room temperature to 1300° C.
500° C./hr from 1300° C. to 600° C.
approximately 200° C./hr from 600° C. to room temperature.

Schedule No 6

180° C./hr from room temperature to maximum temperature
approximately 50° C./hr from maximum temperature to 600° C.
approximately 100° C./hr from 600° C. to room temperature

Schedule No 7

180° C./hr from room temperature to 330° C.
300° C./hr from 330° C. to 950° C.
120° C./hr from 950° C. to 1380° C.
300° C./hr from 1380° C. to 600° C.
approximately 200° C./hr from 600° C. to room temperature.

EXAMPLE 1

In this Example the particulate metal used was Ni287 and the ceramic component composition used was Composition No 3, mixed by means of a mortar and pestle. The pressing was at a pressure of 98 MPa in a 10 mm diameter circular die. Sintering was according to Schedule No 1.

When layers of the nickel and Composition No 3 were used on their own, no bonding between the alumina component and metal component was found to occur. However, when an intermediate layer was used between the metal layer and the ceramic layer, bonding could be achieved. The intermediate layer was a mixture, mixed by means of a spatula, of 50% by mass of said Composition No 3 and 50% by mass of Ni287. The thickness of this intermediate layer was, after sintering, of the same order of magnitude as the thickness of the alumina component and the metal component layers which was 0.8 mm, the thickness of the alumina component layer being 3.8, mm after sintering.

EXAMPLE 2

In this case Example 1 was repeated, with pressing taking place at 110 MPa and employing Schedule No 2 for the sintering. Furthermore, the intermediate layer comprised a mixture of Ni287 and Composition No 4.

When the intermediate layer comprised 80% by mass Ni287 and 20% by mass Composition No 4, no bond could be achieved between the ceramic component and the metal component, because although the intermediate layer bonded to the metal component, it did not bond to the ceramic component. However, when a second intermediate layer was provided between the original intermediate layer and the ceramic component composition layer, bonding was found to occur. This second intermediate layer comprised 33% by mass Ni287 and 67% by mass Composition No 4.

Similarly, bonding was found to occur when the intermediate layer adjacent the nickel layer comprised 82% by mass Ni287 and 18% by mass of Composition No 4, the second intermediate layer being left unchanged.

In each case the second intermediate layer had substantially the same thickness, after sintering, as the first intermediate layers, both having a thickness of 1.6 mm and the ceramic component layer having a thickness of 3.9 mm.

The use of two intermediate layers as described above was repeated at pressing pressures respectively of 85 MPa and 98 MPa, employing Schedule No 3. Once again, bonding was achieved.

EXAMPLE 3

Example 2 was repeated, but using firing Schedule No 4 and Composition No 9 for the ceramic component composition, while employing intermediate layers of the various compositions. In this Example Composition No 9 was formed by mixing with an attrition mill, and the intermediate layers were mixed by spatula.

In one case an intermediate layer was provided adjacent the nickel layer which comprised 78% by mass Ni287 and 22% by mass of Composition No 11, and a second intermediate layer, adjacent the ceramic component composition layer and comprising 50% by mass Ni287 and 50% by mass of Composition No 11. The thickness of the individual intermediate layers, which were approximately of equal thickness, was varied, to be, after sintering, respectively 0.4 mm, 0.8 mm and 1,6 mm. When this thickness was 1.6 mm, no bonding occurred, but in the other cases satisfactory bonding occurred.

The test was repeated, substituting, in the first interlayer, Composition No 4 for Composition No 11. Bonding was achieved in each case, including that where the individual thickness, after sintering, of the intermediate layers was 1.6 mm.

Composition No 11 was formed by mixing in an attrition mill whereas Composition No 4 was mixed using a mortar and pestle.

EXAMPLE 4

Example No 1 was repeated, except that the firing schedule of Example 3 was employed and was varied so that the maximum temperature of 1300° C. of Example 3 was replaced by a maximum temperature of 1390° C. and the dwell time at this temperature was 30 minutes.

In this case Composition No 3 of Example 1 was replaced by either Composition No 1 or Composition No 2, in each case mixed by mortar and pestle, and intermediate layers were employed of mixtures of Ni287 with either Composition No 1 or Composition No 2.

When the ceramic component composition layer was Composition No 1, the intermediate layer was a mixture of Ni287 and Composition No 1. The intermediate layer had about the same thickness as the nickel component layer, and compositions were used for the intermediate layer comprising respectively 50% Ni287 by mass with 50% by mass Composition No 1; 60% by mass Ni287 with 40% by mass Composition No 1; and 67% by mass Ni287 with 33% by mass Composition No 1. In each case bonding was achieved.

The above tests were repeated with Composition No 2 being substituted for Composition No 1. Bonding was achieved in each case but the ceramic component in each case cracked extensively.

EXAMPLE 5

In this Example a 22 mm circular die was employed, with Schedule No 5. The metal component layer was formed from Ni287 and the ceramic component composition layer was Composition No 10, which was mixed mainly by attrition milling but with some additives being mixed into it using a mortar and pestle.

In this case an intermediate layer was employed and a stabilizing layer on the side of the metal component layer remote from the intermediate layer.

In one test, pressing took place at 33 MPa, the proportions of materials being selected so that the stabilizing layer had a thickness, after sintering, of 0.4 mm and the intermediate layer had a thickness after sintering of 1.6 mm. The intermediate layer and stabilizing layer had the same composition, being a mixture of 50% by mass Ni287 and 50% by mass Composition No 5. Bonding was achieved.

The test was repeated, with the thickness of the intermediate layer, after sintering, being altered to 0.8 mm, and Composition No 5 in the intermediate and stabilizing layers being replaced by Composition No 6. Bonding was achieved, and when this test was repeated using 16 MPa instead of 33 MPa, bonding was again achieved.

The materials for the intermediate and stabilizing layers were prepared by mixing with a spatula.

EXAMPLE 6

Example No 5 was repeated with the Ni287 being replaced by Ni255 and pressing being carried out respectively at 33 MPa and 59 MPa. In each case bonding was achieved.

EXAMPLE NO 7

Example No 5 was repeated with, in certain cases, the Example No 5 was repeated Ni287 being replaced by a first metal mixture which which was a mixture of 50% by mass Ni255 and 50% by mass Ni287, and in other cases by second metal mixture which was mixture of 50% by mass Ni287 and 50% by mass Inco HDNP described above.

In each case Composition No 5 was used for the intermediate and stabilizing layers, mixed either with the first metal mixture when the first metal mixture was used for the metal component, or with the second metal mixture when the second metal mixture was used for the metal component. The metal mixtures were prepared using a spatula.

In all cases bonding was achieved.

EXAMPLE 8

Example 7 was repeated, but omitting the stabilizing layer and the intermediate layer, pressing being at 6.7 MPa and employing various mixtures of Ni255 and HDNP for the metal component layer. Compositions for the metal component layer were mixed using a spatula and comprised respectively 80% by mass Ni255 and 20% by mass HDNP; 60% by mass Ni255 and 40% by mass HDNP; 50% by mass Ni255 and 50% by mass HDNP; and 40% by mass Ni255 and 60% by mass HDNP. Bonding was achieved in each case.

EXAMPLE 9

Example 8 was repeated except that the metal component layer was Ni255 and various pressing pressures were employed, namely 2 MPa, 4 MPa, 6.7 MPa, 13.4 MPa and 20 MPa.

Bonding was achieved in each case.

EXAMPLE 10

Example 9 was repeated except that an annular die was employed of 17 mm outside diameter and 8 mm inside diameter, pressing being at 20 MPa and a metal component layer being provided on opposite sides of a central ceramic component composition layer. Bonding was achieved on both sides of the ceramic component layer.

EXAMPLE 11

Example 10 was repeated but using firing schedule No 6 with maximum temperatures respectively of 1280° C., 1300° C. and 1320° C.; and, after the pressing, the firing took place with the pressed green artifact partially surrounded by a powder bed of ceramic material having the same composition as the ceramic component layer, to reduce any loss of additives from the ceramic component layer during firing. A mass of 8 g was also placed on top of the green artifact during the firing to assist the layers to conform mechanically with one another during the sintering.

Bonding was achieved in each case.

EXAMPLE 12

In this case a 10 mm circular die was used, with pressing at 260 MPa, and sintering according to Schedule No 7.

The metal component layer was iron powder having an average particle size of 10-15 μm. For the ceramic component layer Compositions Nos 7, 8 and 9 were respectively employed. Intermediate layers were employed in each case, comprising mixtures of the iron and said Compositions 7, 8 and 9, the same ceramic component composition being employed for the intermediate layer as was employed for the ceramic component composition layer in each case.

In each case the intermediate layer comprised 50% by mass iron and 50% by mass of the ceramic component composition in question. The ceramic component compositions were prepared by attrition milling, and the intermediate layer compositions were prepared by mixing with a spatula. In each case bonds formed.

We claim:

1. A method of making a composite unitary sintered artifact comprising an α-alumina component and a metal fast with each other, the method comprising the steps of:

mixing together, to form a powder mixture, 90-99% by mass of particulate α-alumina and 1-10% mass of at least one particulate additive which, when dispersed in particulate form in particulate α-alumina, lowers the temperature at which densification of the α-alumina in response to heating takes place;

pressing, from said mixture and a metal powder, a composite green artifact having an alumina portion formed from said mixture and a metal portion formed from said metal powder; and heating, after relieving the pressing, the green artifact under a non-oxidizing atmosphere to a temperature at which both the portions undergo densification, to provide a composite sintered artifact comprising a debased α-alumina component and a metal component.

2. A method as claimed in claim 1, in which the metal powder is selected from the group consisting of transition metals, alloys of transition metals, steels, superalloys of Fe and Ni, and mixtures thereof.

3. A method as claimed in claim 1, in which the α-alumina and additive have a particle size of at most 3 μm, the metal powder having a particle size of at most 20 μm.

4. A method as claimed in claim 1, in which the additive is a glass-forming additive selected from the group consisting of nickel and oxides of manganese, titanium, silicon, nickel, iron, cobalt, chromium, aluminum, calcium, magnesium, boron and mixtures thereof.

5. A method as claimed in claim 1, in which the heating is to a temperature of 1150°-1453° C.

6. A method as claimed in claim 1, in which the pressing is to a pressure of 2-120 MPa.

7. A method as claimed in claim 1, in which the powder mixture comprises 2-8% by mass of the additive and 92-98% by mass α-alumina.

8. A method as claimed in claim 1, which includes admixing, into said powder mixture, 0.25-5% by mass of the metal of the metal component, in powder form and of a particle size of at most 3 μm.

9. A method as claimed in claim 1, which includes the step of providing at least one intermediate component in the artifact, between the α-alumina component and the metal component, by admixing together the mixture from which the alumina component is formed with the metal powder from which the metal component is formed, to form an intermediate powder mixture, the metal powder in the intermediate mixture having a particle size of at most 3 μm, the intermediate mixture comprising 20-80% by mass of said metal and 20-80% by mass α-alumina, the intermediate mixture being sandwiched as an intermediate portion between the alumina portion and the metal portion during the pressing of the green artifact.

10. A method as claimed in claim 9, in which a plurality of said intermediate components are provided between the α-alumina component and the metal component, the metal content of said intermediate components increasing successively in a direction from the α-alumina component to the metal component.

11. A method as claimed in claim 1, which includes the step of resisting disruption of bonds between components of the artifact caused by differences in the densification rates of the metal component and the α-alumina component during the heating, by providing, on the side of the metal component remote from the α-alumina component, a stabilizing component, the stabilizing component being provided by pressing, during the pressing step, a stabilizing portion formed from a stabilizing powder mixture against the side of the metal portion remote from the alumina portion, the stabilizing portion being sintered during the heating step and the stabilizing mixture comprising 20-98% by mass α-alumina.

12. A method as claimed in claim 1, in which the pressing is such as to provide the green artifact with a layered construction, each said portion being in the form of a layer, so that the metal component has a thickness of 0.3-10 mm, the α-alumina component having a thickness of 4-30 mm, and any other component has a thickness of 0.1-0.9 mm.

* * * * *

UNITED STATES PATENT AND TRADEMARK OFFICE
CERTIFICATE OF CORRECTION

PATENT NO. : 5,174,953
DATED : December 29, 1992
INVENTOR(S) : Jonathan L. Albain and Adrian W. Paterson It is certified that error appears in the above-indentified patent and that said Letters Patent is hereby corrected as shown below:

Column 10, line 18, (claim 1), after "1-10%" insert --by--.

Signed and Sealed this

Twenty-sixth Day of October, 1993

Attest:

BRUCE LEHMAN

Attesting Officer

Commissioner of Patents and Trademarks